(12) United States Patent
Foster

(10) Patent No.: US 7,850,043 B2
(45) Date of Patent: Dec. 14, 2010

(54) REFILLABLE/REUSABLE MIXER CONTAINER AND METHOD OF USING SAME

(75) Inventor: Jason Foster, Beverly Hills, CA (US)

(73) Assignee: Replenish Bottling, LLC, West Hollywood, CA (US)

( * ) Notice: Subject to any disclaimer, the term of this patent is extended or adjusted under 35 U.S.C. 154(b) by 592 days.

(21) Appl. No.: 11/835,344

(22) Filed: Aug. 7, 2007

(65) Prior Publication Data

US 2008/0035668 A1 Feb. 14, 2008

Related U.S. Application Data

(63) Continuation-in-part of application No. 11/463,549, filed on Aug. 9, 2006, now Pat. No. 7,565,988.

(51) Int. Cl.
*B67B 7/00* (2006.01)
(52) U.S. Cl. .............................. 222/1; 222/207; 206/219
(58) Field of Classification Search ..................... 222/1, 222/157, 158, 83, 83.5, 207, 209, 180, 186, 222/181.2, 106, 133, 134, 184; 206/219–222
See application file for complete search history.

(56) References Cited

U.S. PATENT DOCUMENTS

| | | | | |
|---|---|---|---|---|
| 2,363,474 A | * | 11/1944 | Schlesinger | 222/179.5 |
| 3,705,668 A | * | 12/1972 | Schwartzman | 222/207 |
| 4,146,154 A | * | 3/1979 | Mastman | 222/109 |
| 4,473,097 A | * | 9/1984 | Knickerbocker et al. | 141/113 |
| 5,312,019 A | * | 5/1994 | Tsao | 222/105 |
| 5,833,124 A | * | 11/1998 | Groves et al. | 222/158 |
| 5,945,076 A | * | 8/1999 | Leonard et al. | 422/300 |
| 7,377,383 B2 | * | 5/2008 | Henry | 206/222 |
| 2006/0113201 A1 | * | 6/2006 | Micic et al. | 206/221 |

OTHER PUBLICATIONS

3M Dose 'n Fill Glass Cleaner Concentrate, Techincal Data, Oct. 2003, 1 Page, 3M.

* cited by examiner

*Primary Examiner*—Lien T Ngo
(74) *Attorney, Agent, or Firm*—Kleinberg & Lerner, LLP; Marvin H. Kleinberg

(57) ABSTRACT

A self-contained mixing and dispensing container having at least two chambers, a means by which fluid may be transferred from one chamber to another, a mechanism to dispense the mixture, and means for refilling at least one chamber with the desired fluid.

20 Claims, 13 Drawing Sheets

REFILLABLE/REUSABLE MIXER CONTAINER AND METHOD OF USING SAME

CROSS-REFERENCE TO RELATED APPLICATIONS

The present application is a continuation-in-part of the parent application Ser. No. 11/463,549 filed Aug. 9, 2006 and entitled "Refillable/Reusable Mixer Bottle" the entirety of which, including the claims, abstract, specification and drawings, is incorporated herein by reference.

BACKGROUND OF THE INVENTION

1. Field of the Invention

The present invention relates to a container for storing, mixing, and dispensing measured volumes of liquid and a method of using the container.

2. Description of the Related Art

The present state of the art involves the use of "pump sprayers" attached to a container to apply liquids of varying functions to a desired area to be treated with the liquid. Various liquids may be used for cleaning, as pesticides, fertilizers, and for other functions. Upon using the contents of the container, the present state of the art teaches to either: dispose of the container and purchase a new one, or to refill the container after use, using a mixture of concentrate and water or a similarly pre-mixed solution or from a larger, bulk storage container.

The problems with the prior art are two fold. By disposing of the containers, an increased amount of waste is produced, adding to the global problem of waste management. By refilling the container with a concentrate, the end user is forced into contact with a potentially hazardous material in its concentrated form. The storage of the concentrate is also an issue as concentrate liquids have a shorter shelf life and are often hazardous and poisonous. This problem is further complicated by forcing the end user to measure the ideal ratio of concentrate to diluent to reproduce the desired effective mixture.

A number of containers have been developed which separately store two substances, and allow the two substances to be introduced to one another prior to being dispensed. U.S. Pat. Nos. 6,305,576, 6,152,296 and 6,073,803 all utilize the use of a puncturing or breaking device to allow the contents in the two containers to be mixed with one another. However, the use of the puncturing device renders the containers non-reusable.

U.S. Pat. No. 6,851,580 teaches a reusable container containing a small bottle positioned within a larger bottle, whereas the small bottle empties its contents into the large bottle using a release mechanism.

U.S. Pat. Nos. 4,646,948, 6,290,102 and 4,893,732 disclose containers having at least two chambers or compartments. One chamber acts as a reservoir for storing a liquid and the other chamber is a measuring and dispensing chamber arranged to receive a predetermined volume of liquid from the reservoir chamber and then to dispense the measured volume. All three prior patents disclose the transfer of liquid from the reservoir chamber to the measuring chamber by tilting the container or by squeezing the reservoir chamber to force the liquid into the measuring chamber. However, none of the prior patents disclose the mixing of liquids in the second chamber to form a third liquid.

SUMMARY OF THE INVENTION

It is an object of the invention to provide a self-contained mixing and dispensing container having a mechanism with which to measure and introduce the liquids to one another. It is another object of this invention to provide a mixing and dispensing container which is easy to manufacture and use. It is further an object of this invention to produce a mixing and dispensing container capable of having all chambers refillable, thus rendering the container reusable.

The present invention consists of a self contained mixing and dispensing container having at least two chambers, a mechanism by which fluid may be transferred from one chamber to another, a mechanism by which to dispense the mixture, and in one embodiment, openings on each of the chambers for refilling the chambers with the appropriate fluid.

The first chamber contains a concentration of the active solution and an inlet connected to a mechanism by which the concentrate is introduced to the second chamber. The mechanism may be a pump, siphon, valve or any other instrument capable of displacing the concentrate. The mechanism is designed to either transfer a pre-determined amount of fluid per activation or to transfer a pre-determined amount per activation, thus ensuring an accurate concentrate to diluent ratio.

After the desired amount of concentrate has been transferred to the second chamber, the diluent is added to the second chamber through an aperture or through the top of the container. Once the second chamber is filled, the cap is closed and the container is shaken to ensure thorough mixing of the component liquids. This process may be repeated, allowing the end user to increase or decrease the strength of the mixture.

In one embodiment, the concentrate is provided in a collapsible concentrate bag. Once the concentrate is empty the user may replace the concentrate bag or chamber with a new full bag.

In an alternative embodiment, the concentrate is maintained in a non-collapsible chamber. In this embodiment, the consumer need only refill the concentrate chamber through a second aperture and continue using the container as described above.

Each of the embodiments may include a measurement means, built into an upper or lower chamber (or bag) to allow the user to measure the amount of liquid in one or the other chamber. These measurement means allow users to adequately gauge the quantity of liquid prior to reducing a concentrate (if used).

These and other objects of the invention, as well as many of the intended advantages thereof, will become more readily apparent when reference is made to the following description, taken in conjunction with the accompanying drawings.

BRIEF DESCRIPTION OF THE DRAWINGS

FIG. 2 including FIGS. 2A, 2B, 2C and 2D wherein 2A is a cross-sectional view of the mixer container including an internal LMS valve according to another embodiment of the invention, wherein FIG. 2B is an exploded cross-sectional close-up view of the LMS valve assembly, with the LMS valve in the retracted position, included in the mixer container, wherein FIG. 2C is a close-up view of the LMS valve in the activated position and wherein FIG. 2D is a top-down view of the LMS valve.

FIG. 3 is made up of FIGS. 3A, 3B and 3c is a cross-sectional view of the mixer container according to an alternative embodiment including an internal duck valve, wherein FIG. 3B is an exploded cross-sectional close-up view of the duck valve included in the mixer container and wherein FIG. 3C is a top-down view of the duck valve.

FIG. 4 is made up of FIGS. 4A and 4B, wherein FIG. 4A is a cross-sectional view of the mixer container including a replaceable collapsible multi-chambered bag and wherein FIG. 4B is a perspective view of the cap and a collapsed multi-chambered bag.

FIG. 5 is made up of FIG. 5A and FIG. 5b wherein FIG. 5A is a cross-sectional view of the mixer container including a replaceable collapsible bag and FIG. 5B is a perspective view of the cap covering the replaceable collapsible bag and a collapsed replaceable collapsible bag.

FIG. 6 includes FIG. 6A and FIG. 6B, wherein FIG. 6A is a cross-sectional view of the mixer container including a replaceable non-collapsible chamber and FIG. 6B is a perspective view of the cap and the replaceable non-collapsible chamber.

The descriptions which follow are to be understood as illustrative and exemplary of specific structures, aspects and features within the broad scope of the present invention and not as limiting of such broad scope. Like numbers refer to similar features of like elements throughout.

DETAILED DESCRIPTION OF THE INVENTION

Figure 1:
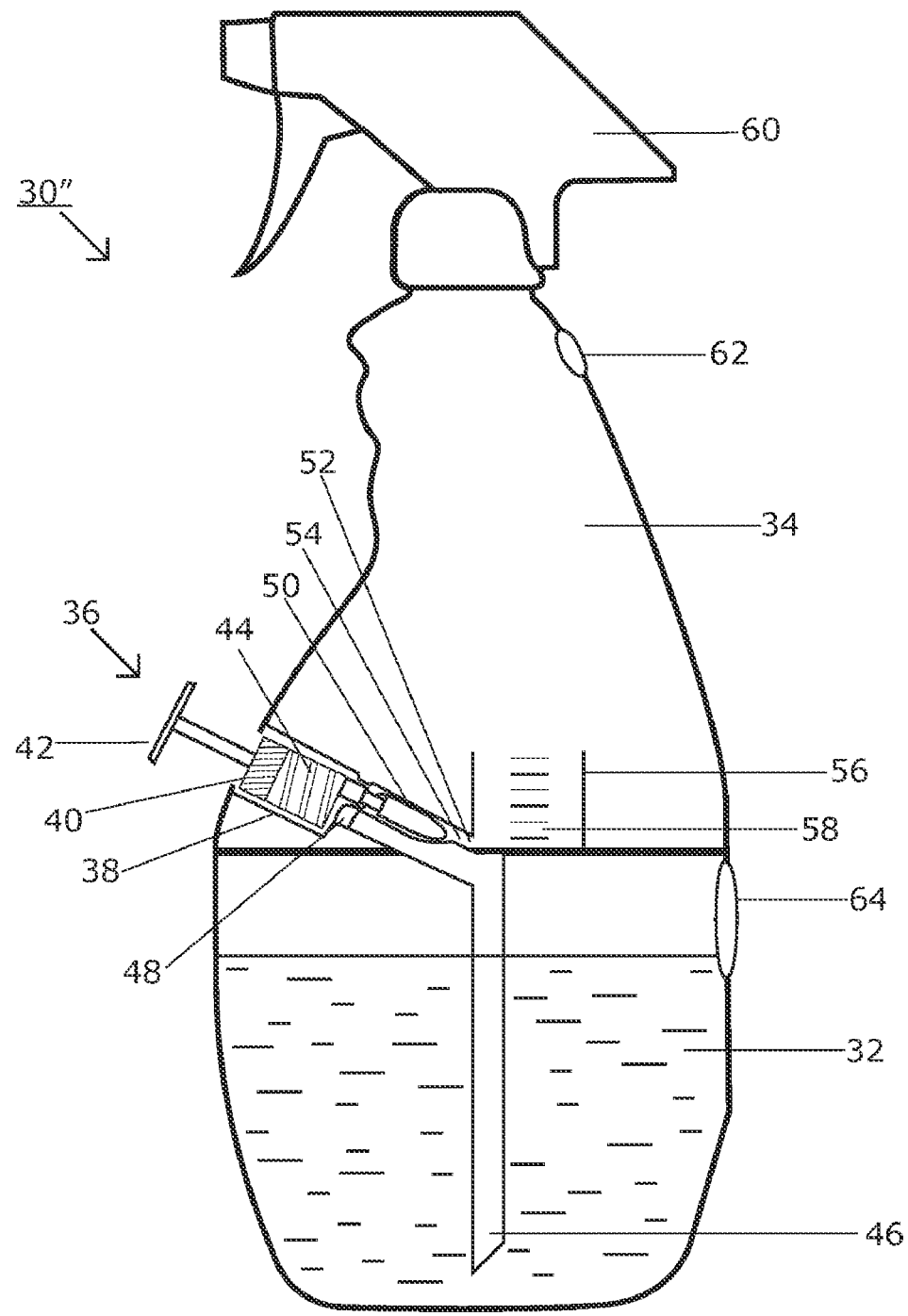
FIG. 1 is a side sectional view of a mixer container according to the present invention with a pump in the retracted position.

The invention will now be described with reference to FIG. 1, which illustrates in side sectional view, the mixer container 30. The mixer container 30 includes the lower chamber 32 containing a liquid, an upper chamber 34 that is provided with a pump mechanism 36 which functions to pump fluid or liquid from the lower chamber 32 to the upper container 34. The pump mechanism 36 is provided with a pump cylinder 38, a piston 40, pump actuator 42, a coil spring 44 and a feed pipe 46 reaching the bottom of the lower chamber 32.

The pump mechanism 36 has a one way inlet valve 48 connected to a feed pipe 46 and an exit pipe 50 leading to an opening 52 containing a one way valve ball 54. The exit pipe 50 leads to a measurement container 56 having measurement graduations 58 thereon.

The mixer container 30 also has a dispensing mechanism 60. The upper chamber 34 has an aperture 62 as does the lower chamber 32, aperture 64. Aperture 62 and aperture 64 allow easy refilling of the independent upper chamber 34 and lower chamber 32.

In operation, the pump mechanism 36 is operated by manually pushing down the pump actuator 42, forcing the piston 40 down. This causes any liquid in the pump mechanism 36 to enter the measurement container 56 within the upper chamber 34. Once depressed, the piston rises, through action of the coil spring, causing liquid to enter the pump mechanism 36. This causes the flow of fluid or liquid from the lower chamber 32 through the feed pipe 46 past the one way valve 48, through the exit pipe 50 and one way valve ball 54, through the opening 52 and into the measurement container 56. The pump actuator 42 acts against a coil spring 44 located in the pump cylinder 38, which returns the pump actuator to its outward position for additional pumping. Upon completion of pumping, the pump actuator 42 returns to the outward position.

Figure 2:
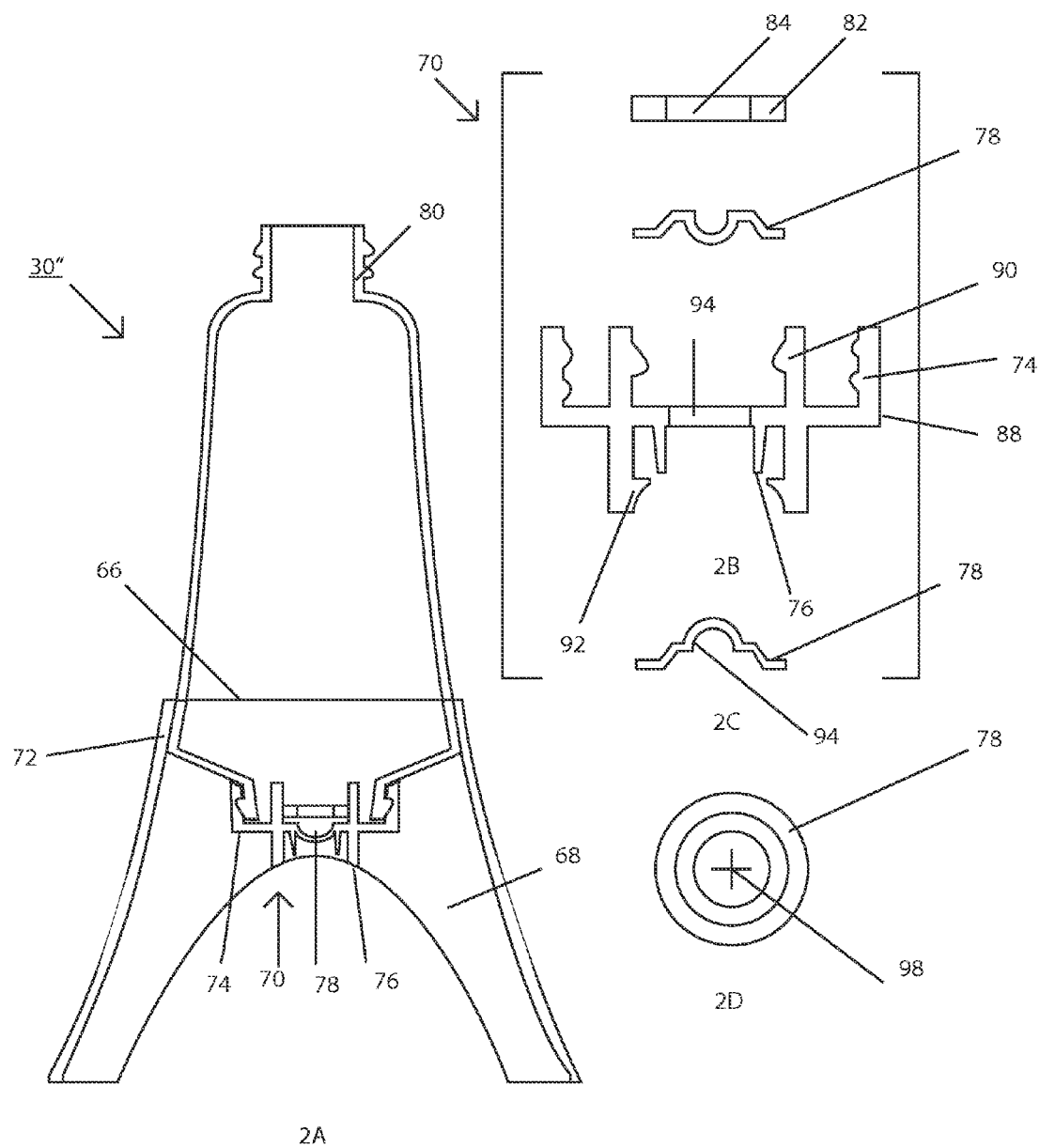
Figure 3:
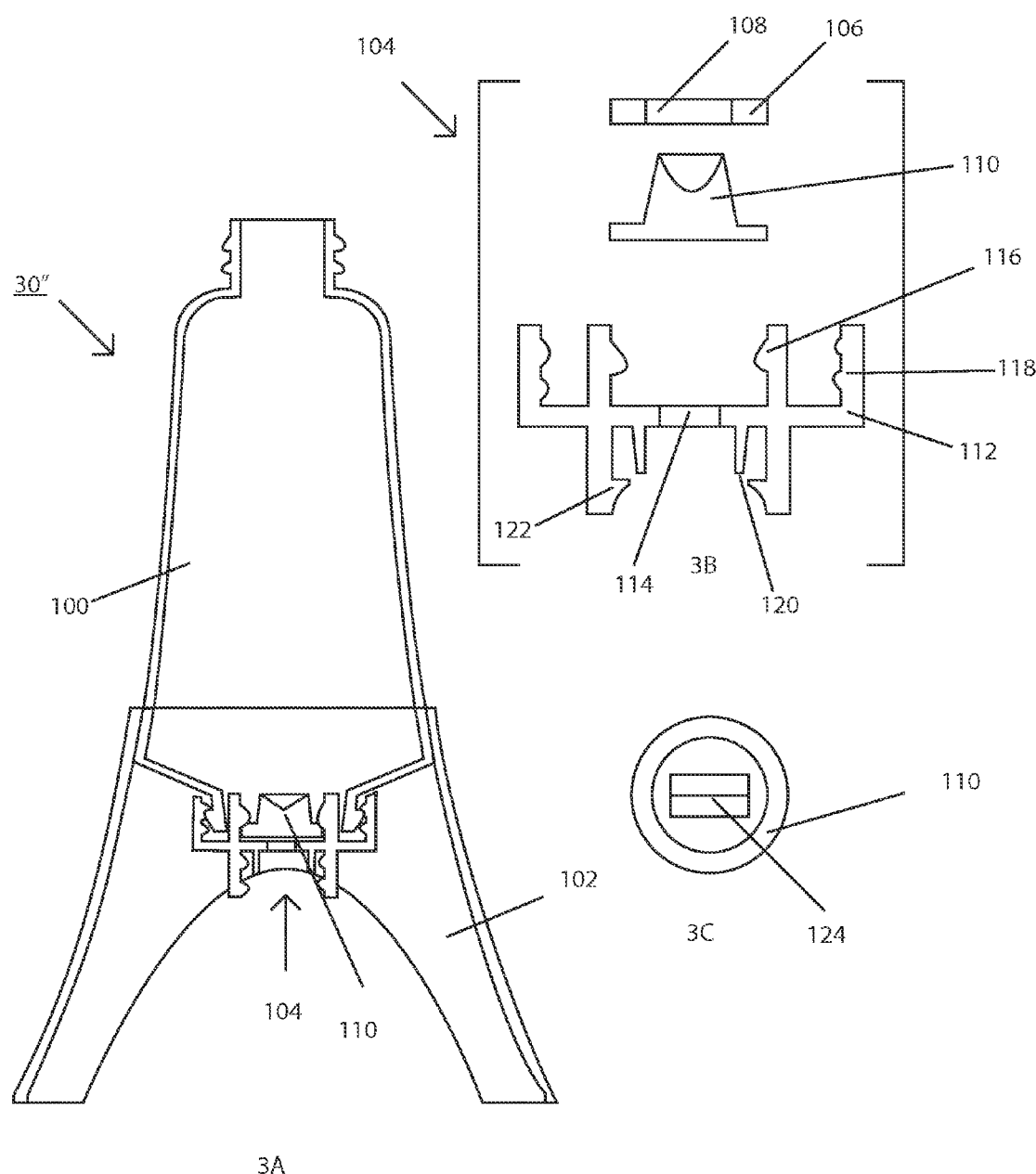

FIG. 2A is an alternative embodiment of the present invention, wherein an alternative mixer container 30' is subdivided into three portions. The first portion is the upper chamber 66. The second portion is the base 68. The third portion is the valve assembly 70. A final portion, not shown in this figure, is a detachable lower bag or chamber. It will be described with more specificity with reference to FIGS. 3-11.

The upper chamber 66 is affixed to the base 68 by means of a notched snap-in connector 72. The notched snap-in connector 72 is used so that the upper chamber 66 and base 68 may be attached to one another without the use of glues or other affixing means. The base 68 of the mixer container 30 can be coupled to the upper chamber 66 using a similar notched snap-in connector 72 and is substantially hidden by the base 68.

In FIG. 2A, the base 68 is shown as a transparent or translucent assembly. However, the upper chamber 66, base 68 or valve assembly 70 may be dyed or otherwise colored by any number of means. The transparency and translucency is provided to the components in FIGS. 2A and 2B so that their operation may be more readily seen. A notched snap-in connector 74 is also provided to hold the valve assembly 70 to the upper chamber 66.

The valve assembly 70 of this embodiment is made up of an LMS valve 78 and an attachment aperture 76. LMS valves are valves of a type known in the art. The LMS valve employed in the present invention is described more fully with reference to FIG. 2B. The attachment aperture 76 is designed in such a way as to accept one of several types of replaceable lower chambers or bags designed to connect to the valve assembly 70 of the present invention. The upper chamber 66 also includes attachment means 80 in an opening suitable for affixing any number of dispensing heads, including the hand-operated gun-style squirt mechanism shown as the dispensing mechanism 60 in FIG. 1.

Referring next to FIG. 2B, an exploded close-up of the assembly of the LMS valve is shown. The first portion is a retainer ring 82. The retainer ring 82 is circular and has a circular hole 84 in its center. The retainer ring 82 is designed in such a way that a portion of the LMS valve 78 may extend through the retainer ring 82 while the valve is open so as to allow liquid to pass upwards through the valve assembly 70 to the upper chamber 66. The LMS valve 78 is retained in place in the valve assembly 70 by the retainer ring 82 around its edges.

The LMS valve 78 is the next portion of the valve assembly 70. The LMS valve 78 is typically made of a flexible plastic or a hardened rubber. However, it may also be made up of any material suitable for storing liquids that retains flexibility through multiple uses. It is described more fully with reference to FIGS. 2C and 2D below.

The final portion of the valve assembly 70 is the valve base 88. This is made up of a hard material, capable of retaining the LMS valve 78 in place. The valve base 88 also includes a first notched snap-in holding mechanism 90 for holding the retainer ring 82 in place. The LMS valve 78 is placed underneath the retainer ring 82. The first notched snap-in holding mechanism 90 is used to hold the LMS valve 78 in place. The valve base 88 also includes the notched snap-in connector 74.

The valve base 88 also includes a third snap-in holding mechanism 92, which acts as a means for attaching the valve to a bag or chamber (see FIGS. 4-11). As a part of this means is included, in the preferred embodiment, attachment guide means 98 for holding the bag or lower chamber (see FIGS. 4-11) in place and attachment aperture 76 for maintaining the bag or lower chamber in place so that liquid may appropriately flow from one chamber to the next when desired.

Referring now to FIGS. 2B, 2C and 2D, the LMS valve 78 is designed in such a way that it naturally sits in the position shown in FIG. 2B, downward and in a bubble-like formation. In this position, the valve is substantially impermeable by gas and liquid from below. However, upon the application of pressure (gas or liquid) to the LMS valve 78 from a lower chamber (see FIGS. 4-11), for example, holding liquids, the valve extends upward (see FIG. 2C) into the upper chamber 66 (see FIG. 2A) and opens allowing liquid or gas to pass through the valve into the upper chamber 66. Typically the valve opening 98 in the LMS valve appears as an "X" across its top when open (see FIG. 2D).

In the closed position, when little or no pressure is being applied on the LMS valve 78 by a user squeezing an attached lower chamber or bag (see FIGS. 4-11) or turning the mixer container 30' upside down, the valve is substantially impermeable to liquids and gases from above as well. This also allows the valve 78 to act so as to not allow flow backwards (downwards as shown) from the upper chamber 66 (see FIG. 2A). This enables the LMS valve 78 to act as a one-way valve for introducing the concentrate or other liquid into the upper chamber from a lower chamber or bag (see FIGS. 6-8) through the LMS valve 78.

FIG. 3A depicts the use of an alternative valve type, the "duck valve." The mixer container 30" of this embodiment also includes an upper chamber 100, a base 102 and a valve assembly 104. However, in this embodiment the valve assembly 104 includes a "duck valve." A more detailed description of the duck valve is provided with description of FIGS. 3B and 3C.

Referring now to FIG. 3B, an exploded close-up cross-sectional view of the valve assembly 104 is shown. The first element is the retainer ring 106. The retainer ring 106 acts in similar fashion to that of the retainer ring 82 in FIG. 2B. The retainer ring 106 has a circular hole 108 through which a portion of the duck valve 110 passes.

The next portion is the duck valve element 110. The duck valve element 110 is designed in such a way that the valve element 110 is closed when not being acted upon by outside pressure from below (as shown). The closure takes place primarily through the action of downward pressure, provided by liquid or gas above the top of the valve and the action of gravity.

The duck valve element 110 may be opened in a manner similar to that of the LMS valve 78 (see FIG. 2), by the application of pressure from gas or liquid from below the valve element 110. When pressure is applied, the duck valve element 110 opens and allows gasses and liquids to pass upward (as shown) through the valve. Once the pressure subsides, the two lips or "top" and "bottom" of the duck valve element 110 close through the action of the above-described downward pressure of the liquid or gas above the valve. The duck valve element 110 then becomes substantially impermeable to liquids and gasses.

The final portion of the duck valve assembly 104 is the valve base 112. The valve base 112 acts similarly to the valve base 88 previously described with reference to FIG. 2B and includes a valve aperture 114. The valve base 88 contains a first snap-in holding mechanism 116 and a second snap-in holding mechanism 118 similar to the valve assembly 70 described in FIG. 2B. Finally, it includes a attachment guide means 120 for guiding the bag or chamber (see FIGS. 4-11) onto the mixer container 30".

Referring now to FIG. 3C a top-down view of the duck valve 110 is shown. As can be seen it is primarily circular and tapers at its top to a point. The valve opening 124 is primarily upon a longitudinal line from one side of the valve to another. As pressure is applied from below, the valve allows passage of gasses or liquids from below to above. Alternatively, the mixer container 30" may be flipped upside-down to allow the valve to open. Once the pressure subsides, the valve opening 124 closes and the valve 110 is substantially impermeable to liquids and gasses.

Referring now to FIGS. 4A-4B, a multi-chambered collapsible bag for use as the lower chamber of the mixer container 30' is shown. The mixer container 30' of FIG. 2A is shown, including an upper chamber 66, a base 68 and a valve assembly 70. However, affixed to the valve assembly 70 in this embodiment is the multi-chambered collapsible bag 122.

The multi-chambered collapsible bag 122 is provided so that the upper chamber 66 may be filed, one chamber at a time, with concentrate simply by pressing the bag up "one chamber" or other measured amount and then adding a predetermined amount of water. This will result in a concentrate being diluted into the desired concentration. In the preferred embodiment, the bag 122 is provided with a multiplicity of chambers, each subdivided within the bag 122 such that sufficient concentrate to create a full upper chamber 66 may be provided in each of the multiplicity of chambers or a subset thereof.

The multi-chambered collapsible bag 122, in conjunction with the valve assembly 104 is a combination not known in the prior art. The user may or may not be provided with any measuring means in either chamber to accurately measure out the desired amount of concentrate liquid from the multi-chambered collapsible bag 122. Instead, the user need only add "one sub-chamber" or any other pre-designated number of sub-chambers to the upper chamber 66 and fill the remaining area in the upper chamber 66 with water to thereby create the precise mixture so that the resulting liquid may act appropriately for its intended purpose.

Once each of the chambers in the multi-chamber collapsible bag 122 have been emptied into the upper chamber 100, the bag may be discarded and replaced with a new bag. Replacement bags, similar to bag 122 are intended to be sold or provided separately in the preferred embodiment, where the device comprising the upper chamber 66, base 68 and valve assembly 70 will be reusable. Discarding only the multi-chamber collapsible bag 122 results in substantially less waste product than replacing an entire dispensing apparatus after each use.

In FIG. 4B, a cap 124 used to protect the top of the bag 126 in the preferred embodiment is shown. When the bag 122 is transported, it is desirable that the bag not be punctured or spill in transport. Accordingly a cap 124 is provided which is user-removable.

Also in FIG. 4B, the filled multi-chamber bag 122 is shown separately from the mixer container 30. The bag 122 includes a tamper indicating closure 128. This is used to indicate if the concentrate in the bag 122 has been tampered with and is made up, in the preferred embodiment, of tamper indicating foil that is user removable.

The bag 122 is designed so as to fit within the base 68 of the mixer container 30. It is further designed to be multi-chambered. For example, first sub-chamber 130 and second sub-chamber 132 may be separated by a thin layer of film. In an alternative embodiment, no film separates sub-chambers, for example the contents sub-chamber 130 from the contents of sub-chamber 132 may not be separated.

In the embodiment with film layers between sub-chambers, the sub-chambers may be pierced with a piercing means, such as the attachment guide means 76 (see FIG. 2A) or other similar apparatus which may pierce each sub-chamber in turn. Each sub-chamber is provided with the exact measurement of liquid to create an appropriate amount of non-concentrate liquid when mixed in the upper chamber 66 with water.

Referring now to FIGS. 4A and 4B as a user presses upward on the multi-chamber bag 122, the first sub-chamber 130 is pierced by the attachment guide means 76 provided (see FIG. 2B). As the first sub-chamber 130 collapses, the chamber 130 injects its contents, through the one-way LMS valve 78 (or duck valve element 110 or other valve type) into the upper chamber 66. The bag 122 is designed in such a way that one sub-chamber is sufficient for an entire upper chamber 66 of liquid cleaner or other mixture. One sub-chamber, when mixed with suitable diluents will result in a combined mixture suitable for use. Once the upper chamber 66 has been emptied, the user may collapse the next second sub-chamber 132, thereby emptying its contents into the upper chamber 66.

The collapsed bag 134 then takes up substantially less space and wastes less material when it is immediately discarded than that of the entire mixer container 30'. This is desirable in terms of cost to manufacture and in terms of impact to the environment. The collapsed bag 134 may then be replaced with a new collapsible multi-chambered bag 122 and the majority of the mixer container 30' may be used numerous times. The mixer container 30' parts are designed in such a way as to be durable enough to last through a substantial number of bags 122.

In an alternative to the embodiment including thin film layers, the sub-chambers may be designed in such a way that they each collapse and empty in turn without being pierced. There may be no division or thin film layers between the respective sub-chambers. The bag 122 is designed such that the material surrounding the first sub-chamber 130 is thinner than the material surrounding the second sub-chamber 132. This continues for each sub-chamber in the bag 122 in turn. The thinner material allows the first sub-chamber 130, upon the application of pressure, to subside completely before the second sub-chamber 132.

As the user presses upward on the bag 122, only the first sub-chamber 130 collapses completely before the second sub-chamber 132 begins to collapse. Accordingly, the chambers each collapse in turn, rather than collapsing, as a group together. This will enable a user to collapse a first sub-chamber 130 and create one full upper chamber 66 of a diluted mixture and subsequently to apply sufficient pressure to collapse a second sub-chamber 132 and to thereby create another full upper chamber 66 (see FIG. 2A) of diluted mixture. This embodiment utilizes no film layers or piercing means and is simpler to manufacture in that no film layers or piercing means need be added to the materials or design of the mixer container 30'.

An alternative embodiment is shown in FIGS. 5A-5B wherein the multi-chambered collapsible bag 122 of FIG. 4A-4D is replaced with a single-chamber collapsible bag 136. In this embodiment, the bag 136 may be provided with concentrate such that the contents of an entire bag 136 may be emptied into the upper chamber 66 and water added so as to fill the upper chamber 66 with the desired mixture. Alternatively, the bag 136 may be provided in ready-to-use form, instead of concentrate, whereby the entire contents of bag 136 are emptied to thereby fill the upper chamber 66 for dispensing.

In FIG. 5B, the protective cap 138 for this embodiment is shown. This embodiment also includes the neck 142 for attachment to the valve assembly 70 (see FIG. 2). Similarly, the tamper-resistant or tamper indicating closure 140 is also shown. The bag 136 of FIG. 5B may be emptied into the upper chamber 66, resulting in the collapsed empty bag 144 of FIG. 5B.

Referring now to FIGS. 6A-6C a non-collapsible chamber 146 used in connection with the mixer container 30' is shown. As above, the upper chamber 66, the base 68 and the valve assembly 70 are shown. The non-collapsible chamber 146 is designed so as to interface with the valve assembly 70 so that the valve may be used to inject the contents of the chamber 146 into the upper chamber 66.

Also as above, the non-collapsible chamber 146 has a cap 148. It also includes a tamper-resistant or tamper indicating closure 150. The chamber 152 is non-collapsible such that the entire mixer container must be inverted in order to fill the upper chamber 66 with the liquid contained within the chamber 146. As above, the upper chamber 66 may be provided with a measurement gradient (see FIGS. 7-11), so as to accurately measure the contents added from said chamber 146 to said upper chamber 66.

Figure 4:
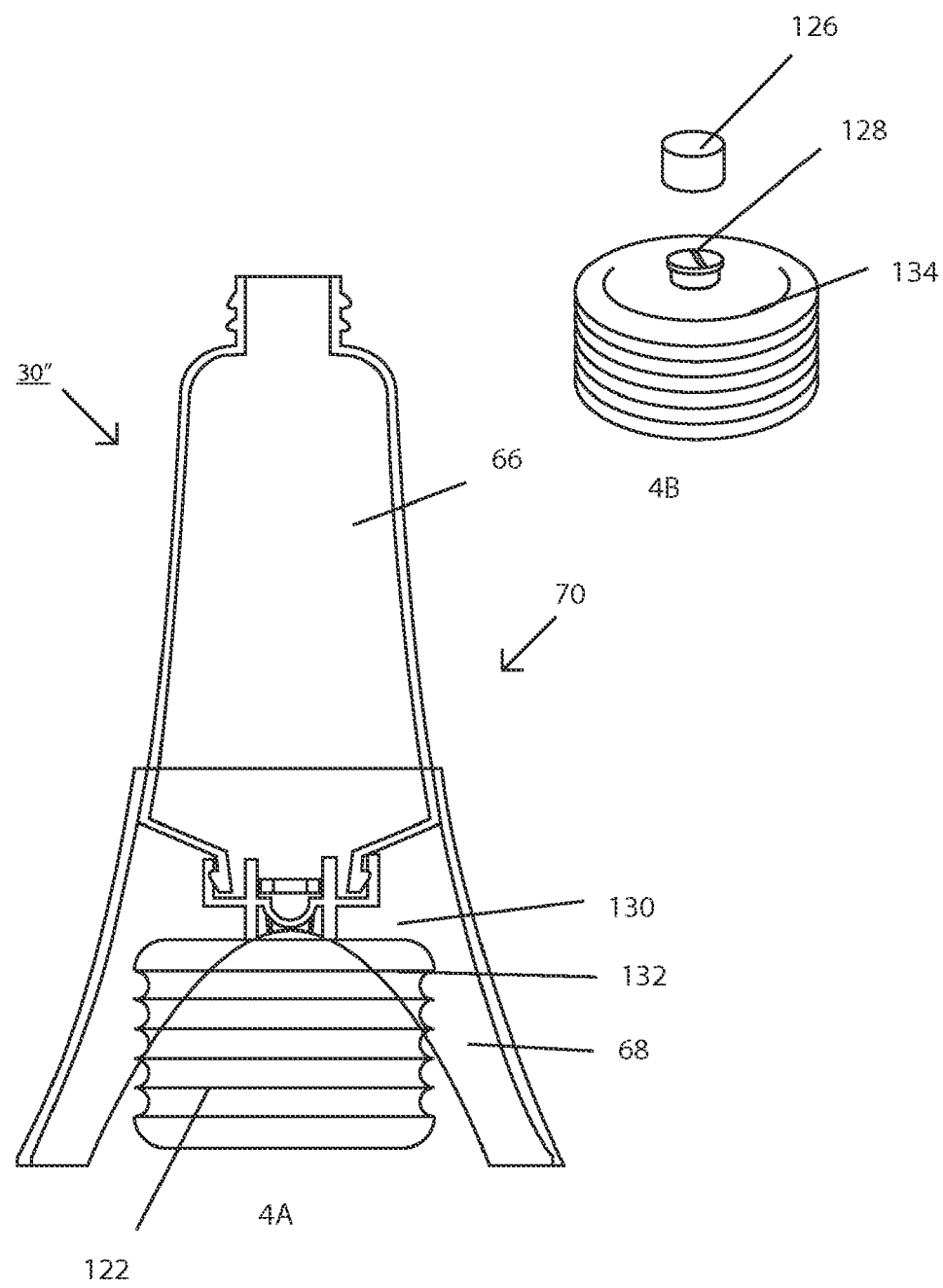
Figure 5:
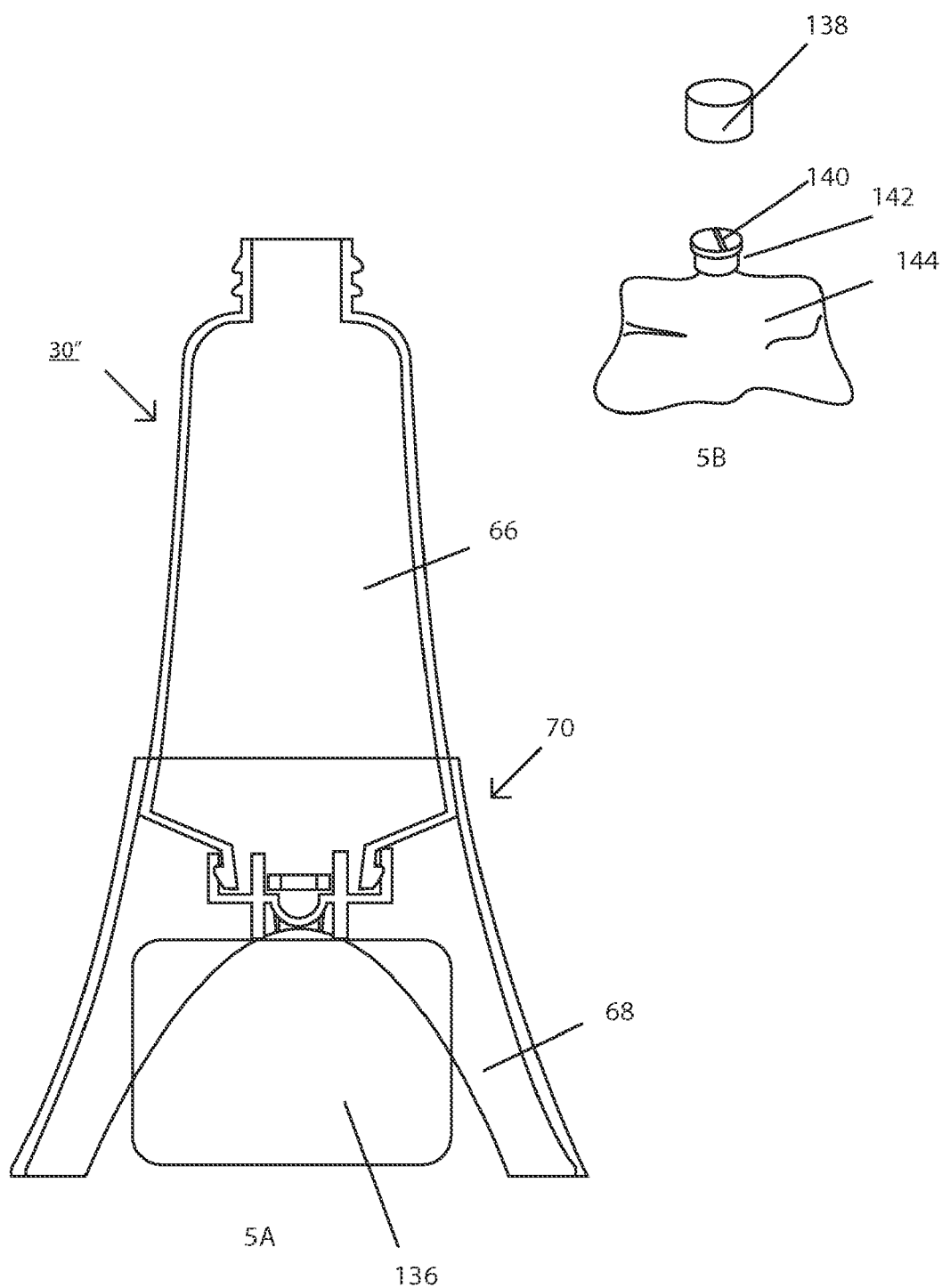
Figure 6:
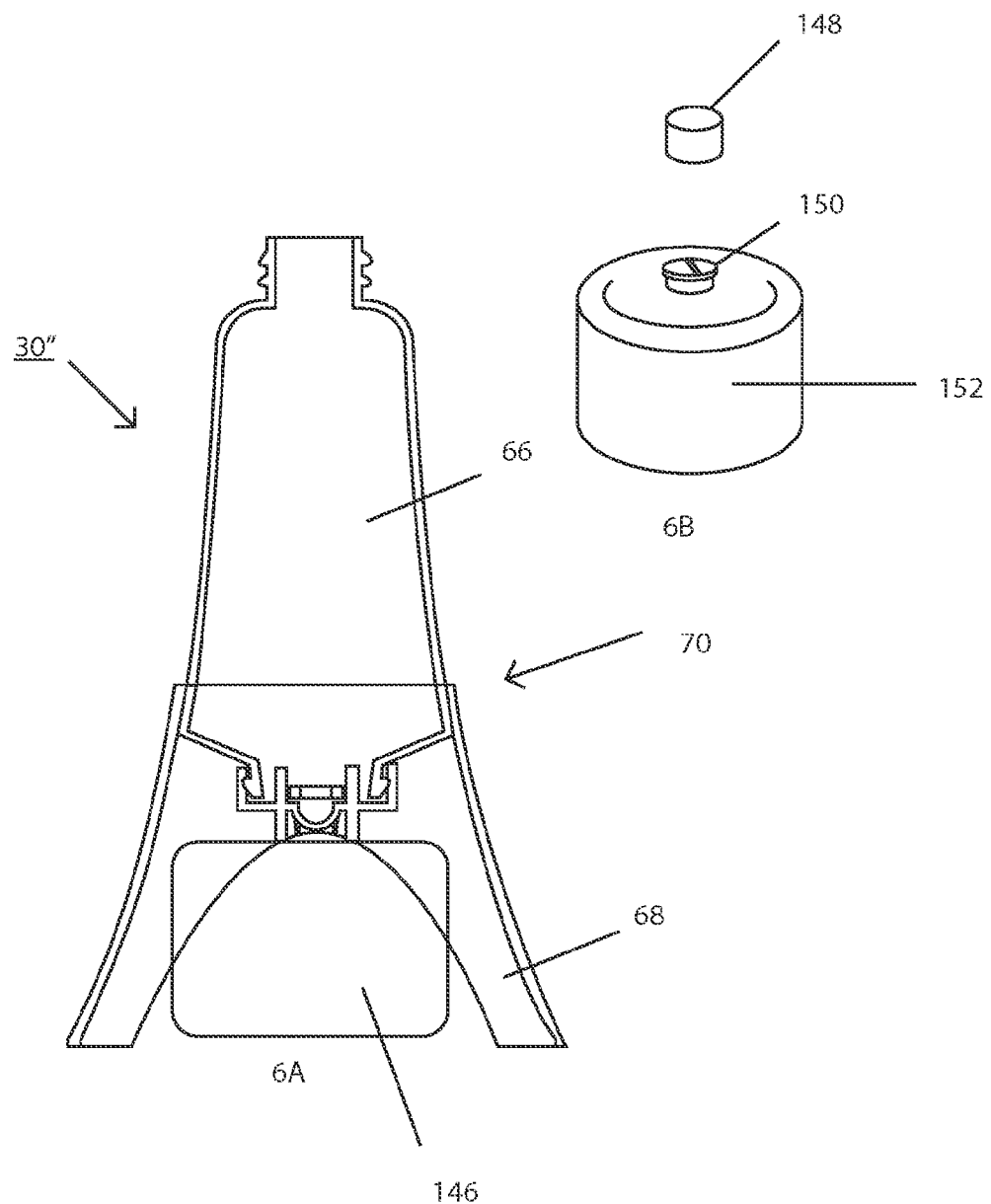

As can be seen in FIGS. 4-6, the LMS valve system is depicted. It is to be understood explicitly that other valves may be used for example, the duck valve system shown in FIG. 3 may be used. However, numerous other types of one-way valve systems may be used.

Figure 7:
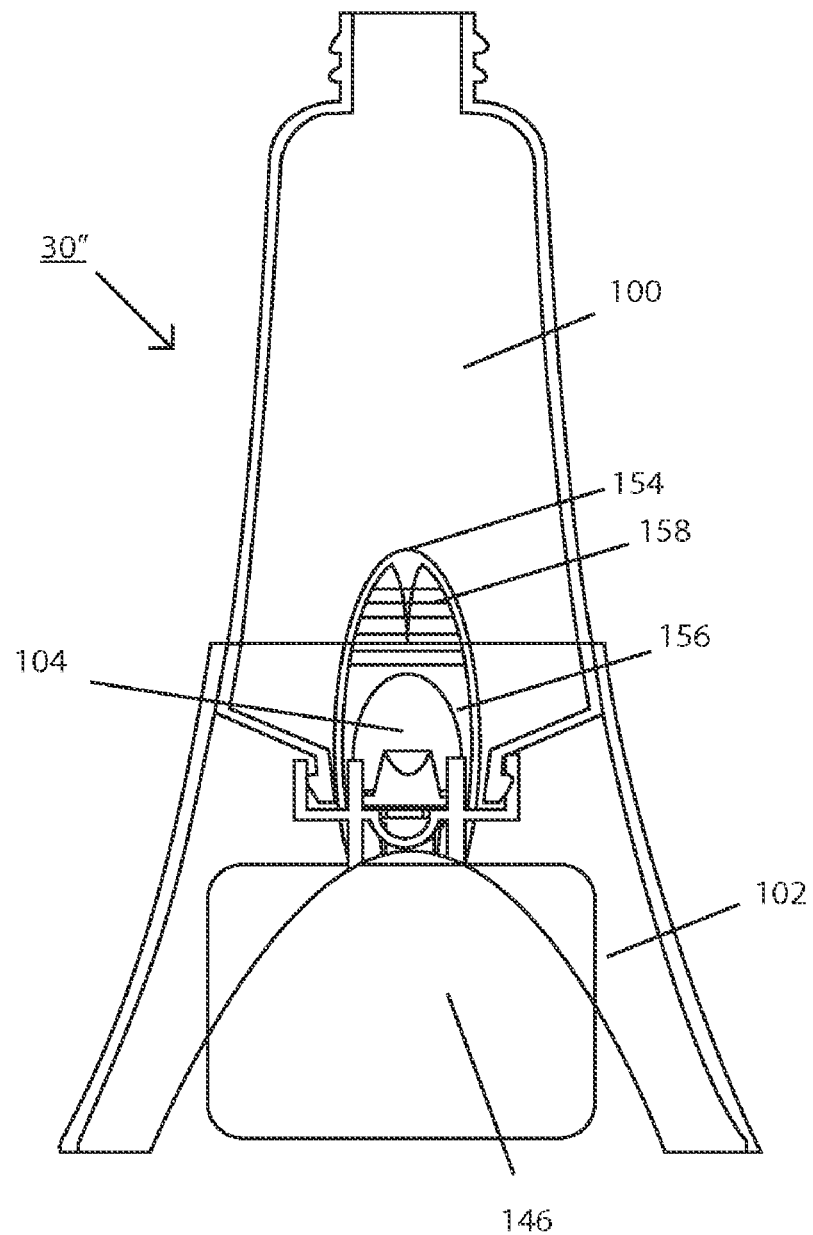
FIG. 7 is a cross-sectional view of the mixer container including a measurement apparatus.
Figure 8:
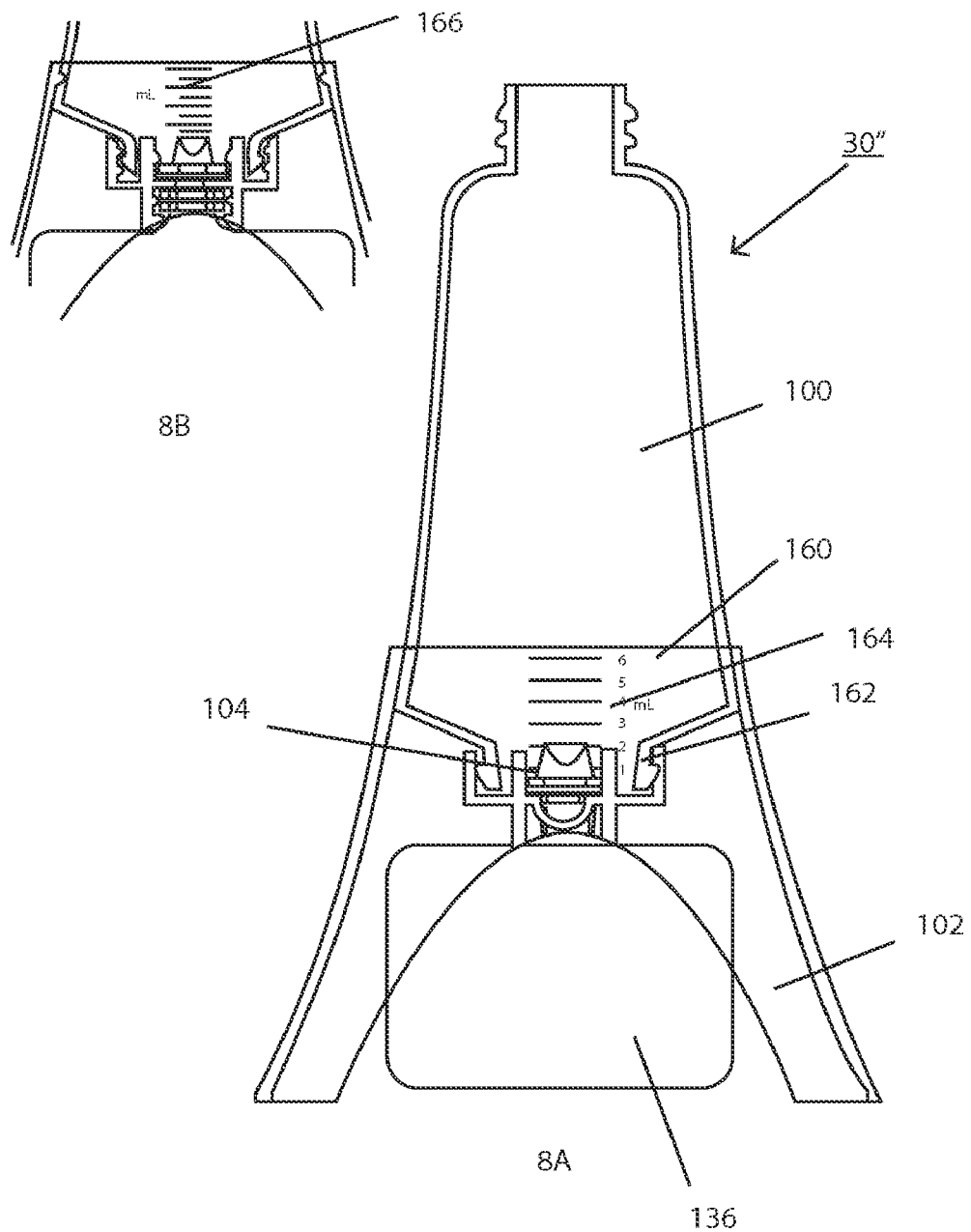
FIG. 8, made up of FIG. 8A and FIG. 8B, is cross-sectional view of the mixer container including an alternative measurement apparatus.

Referring now to FIG. 7, a mixer container 30" including measurement cup 154 is shown. This embodiment includes the upper chamber 100, the base 102 and a valve assembly 104. This valve assembly 104, in contrast to those shown in FIGS. 4-6 is a duck valve.

The measurement cup 154 depicted may be made of plastic and is affixed to the interior of the upper chamber of the mixer container 30". As shown, it may be affixed to the valve assembly 104 by means of two or more arms 156. The measurement cup 154 of this embodiment forms a downward-facing cup above the valve assembly 104. The arms 156 appear only on two sides of the measurement cup 154. The remaining circumference of the attachment points of the arms 156 is open to the remainder of the upper chamber 100.

As shown, the measurement cup 154 includes a number of measurement lines 158. In order to use the measurement lines 158 and the measurement cup 154, the user may turn the mixer container 30" over, thereby actuating the valve assembly 104. As depicted, the act of turning the container over enables any liquid contained in the non-collapsible chamber 146 to provide sufficient pressure on the valve assembly 104 to allow liquid to begin to fill the measurement cup 154 immediately below (when the container is upside-down) the valve assembly 104. The user continues until the appropriate amount of the contents from non-collapsible chamber 146 are in the measuring cup 154.

Once the measuring lines 158 indicate that there is the desired amount of content in the cup 154, the user may then right the container, returning it to the position shown in FIG. 7, and the valve assembly 104 will close and the liquid will remain in the bottom of the upper chamber 100. The open circumference of the cup 154 immediately allows the liquid to exit the cup 154 into the upper chamber 100. A user may then mix water or other ingredients in the container to thereby create a mixture.

Referring now to FIGS. 8A and 8B, an alternative measurement apparatus 160 is shown as a part of the mixer container 30". This figure includes the upper chamber 100, the valve assembly 104 (including the duck valve) and a base 102. The single chamber collapsible bag 136 is also shown. In this embodiment, the upper chamber 100 includes measurement lines 164 on its side-walls. The first set of measurement lines 164 is in ounces, a second set of measurement lines 166, shown on the opposite side of the container, is in milliliters. Measurements are taken from the bottom 162 of the upper chamber 100.

In this embodiment, the user may collapse the bag 136, thereby opening the valve assembly 104 and allowing liquid concentrate to enter the upper chamber 100. Once the desired amount of liquid from the bag 136, as measured by the measurement lines 164 is achieved, the user may stop applying pressure to the bag 136, add water to the upper chamber 100 and shake the container to suitable mix the contents. This embodiment does not require that the container be turned upside-down for measurement.

Figure 9:
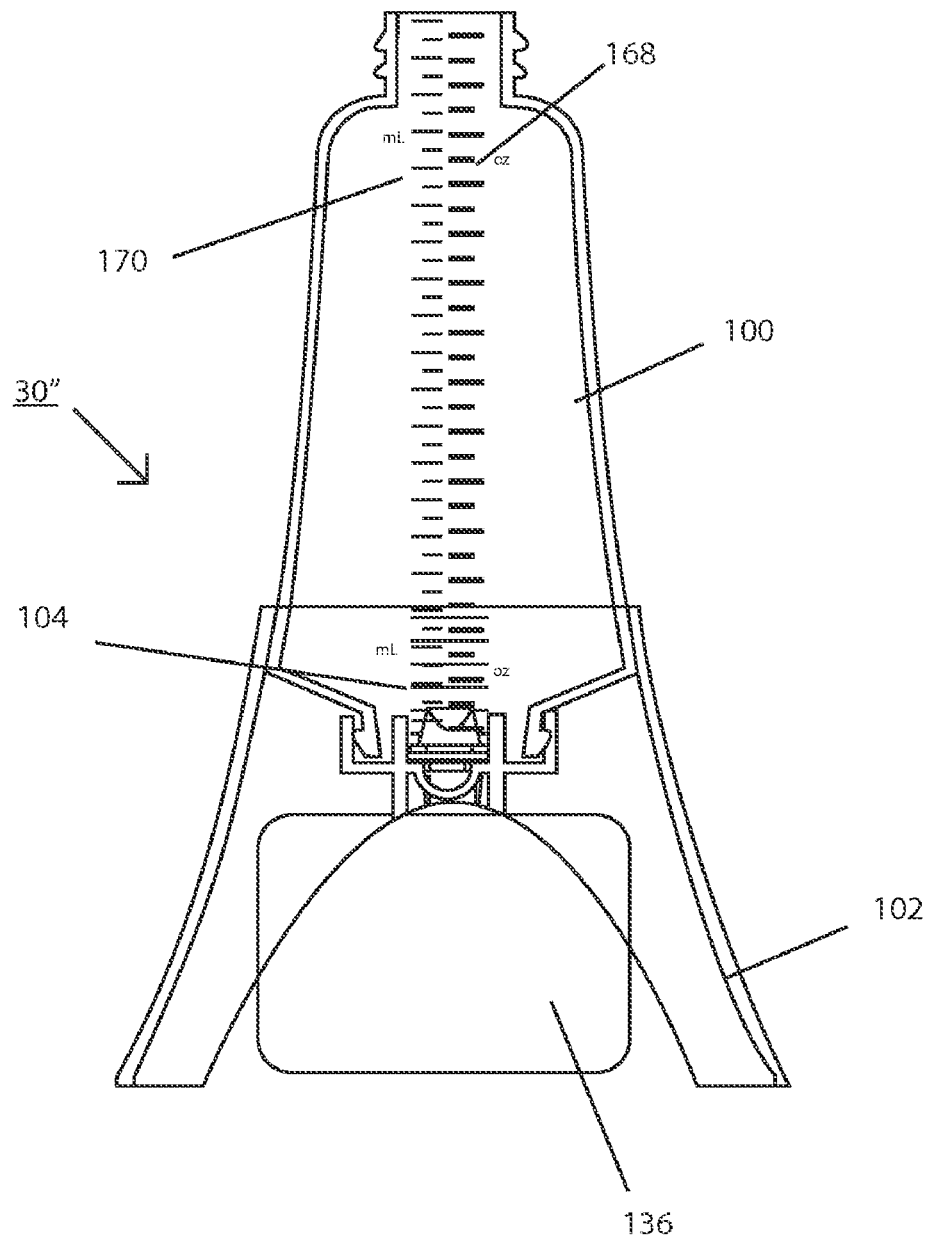
FIG. 9 is a cross-sectional view of the mixer container including yet another alternative measurement apparatus.

Referring now to FIG. 9, an alternative mixer container 30" including measurement lines 168 and measurement lines 170 is shown. In this embodiment, the measurement apparatus is provided in the form of measurement lines 168 and measurement lines 170 provided on the exterior of the entirety of the upper chamber 100. The base 102 and valve assembly 104 are also present in this embodiment.

These measurement lines 168, 170 may be used, as a user applies pressure to the bag 136, to measure the amount of concentrate introduced through the valve assembly 104 to the upper chamber 100. Similarly, the measurements lines 168 and measurement lines 170 may be used to measure the amount of water (or other mixture) added to the container from the top. This embodiment also does not require that the container be turned upside-down for measurement.

Figure 10:
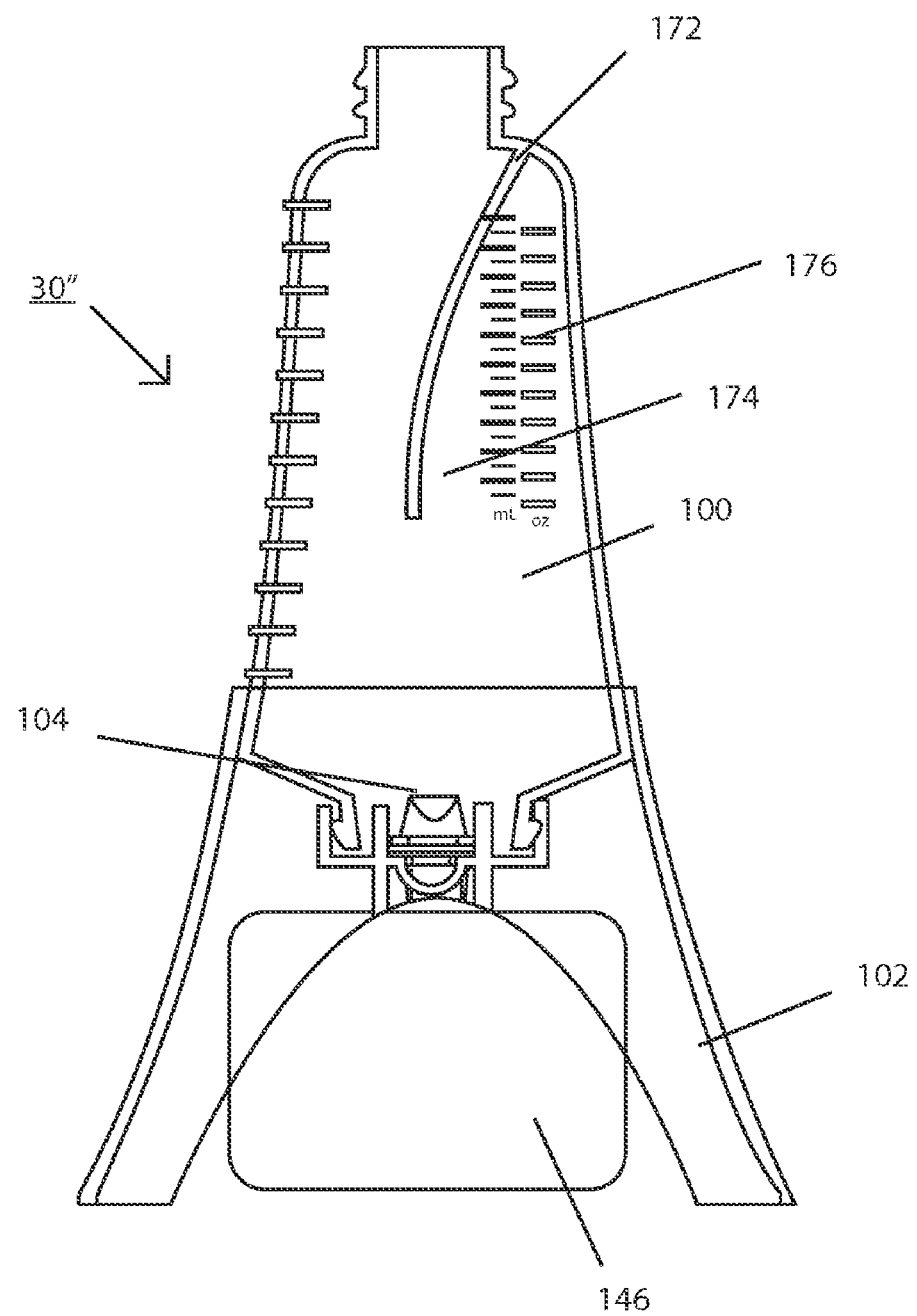
FIG. 10 is a cross-sectional view of the mixer container including yet another alternative measurement apparatus.
Figure 11:
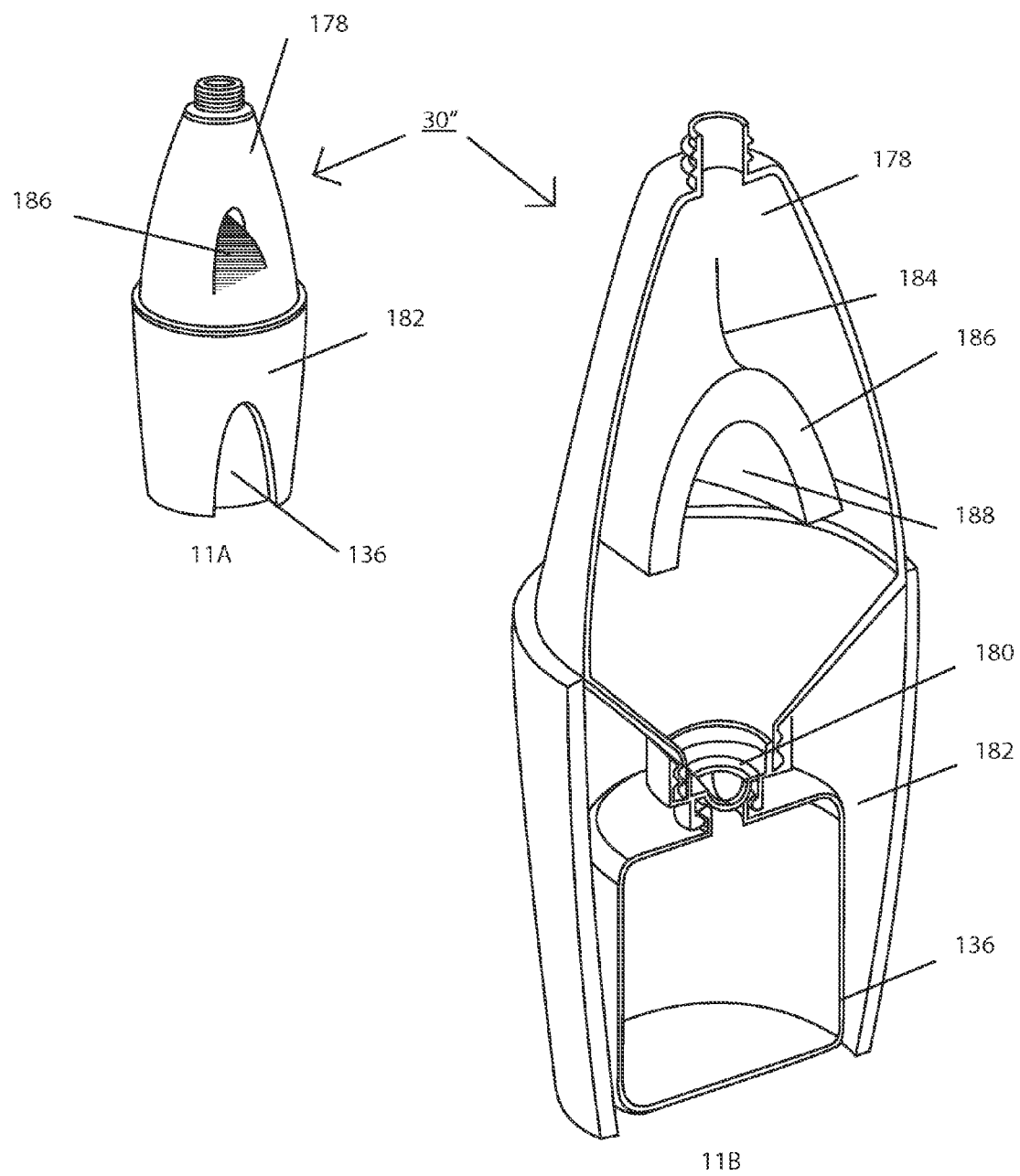
FIG. 11A is a perspective view of the mixer container of another alternative embodiment.
FIG. 11B is a cross-sectional perspective view of the mixer container of this alternative embodiment.

Referring now to FIG. 10, an alternative embodiment of a mixer container 30" including measurement means is shown. The valve assembly 104, the upper chamber 100, the base 102 and the non-collapsible chamber 146 is also present in this figure.

In this embodiment, a wall 172 is used to create a cup area 174 wherein contents from a non-collapsible chamber 146 (or bag 136 or bag 122) will, upon entry into the upper chamber 100, enter for measurement. This cup area 174 is created by the inclusion of a wall 172 dividing a portion of the upper chamber 100. In order to use this measurement apparatus, the container must be turned upside-down.

The wall 172 is provided which subdivides the upper chamber 100 from the upper side of the container to just more than halfway laterally across the upper chamber 100 at a point near the middle of the upper chamber 100 longitudinally. When the container is held upside in order to introduce additional liquid from the non-collapsible chamber 146, this design results in a separate portion of the container receiving all of the contents passing through the valve assembly 104 into the upper chamber 100.

There are provided measurement lines 176 for use in measuring the amount of liquid which has passed through the valve assembly 104 into the upper chamber 100 and being held within the wall 172. Once the desired amount has been introduced to the upper chamber 100, the container may be righted and the liquid will be unable to pass through the valve assembly 104. Accordingly, the user may then fill the remainder of the upper chamber 100 with water (or other mixture) to create the desired solution.

The downward curve from once upper side (right, as shown) to just past the median (middle, as shown) allows the usual tube used in most "squirt containers" to adequately reach the bottom of the upper chamber 100 to thereby receive access to all of the contents of the upper chamber 100. Simultaneously, it provides that the contents exiting the valve assembly 104 all enter the measurement apparatus (when the container is upside down) behind the wall 172 so that the amount of liquid added from the chamber 146 may be measured accurately.

This embodiment is simple to injection mold in that the measurement wall 172 is only an additional part of the upper chamber 100. Additionally, once the mixer container 30" is righted after measurement, the entirety of the upper chamber 100 may be used to collect water (or other concentrate diluents). This wall 172 excellently serves the purpose of allowing measurement of the contents of the non-collapsible chamber 146 as they enter the upper chamber 100 and does not intrude otherwise in the operation of the mixer container 30" of this embodiment.

Referring now to FIGS. 1A and 1B, yet another alternative embodiment of the mixer container 30''' is shown. The upper chamber 178 is, as in prior embodiments, connected to the valve assembly 180, the base 182 and to the single-chamber collapsible bag 136.

In this embodiment, the upper chamber includes a cup 136 whereby liquid exiting the bag 136 may be held for measurement. In order to utilize the cup 186 to measure the concentrate, the mixer container 30''' must be inverted. The cup 186 includes a reservoir 188 for holding liquid as it exits the bag 136 when the container 30''' is inverted. The cup 186, as can be seen most clearly in FIG. 11A, is formed by two opposing sides of the wall of the upper chamber 178 being formed so as to connect in the middle of the container 30'''.

The cup 186 of this embodiment is formed in the center, from a side view, of the upper chamber 178 as seen in FIG. 11A. The contents of the cup 186, as it fills, may be seen from a 90 degree rotation of the mixer container 30''' to either side. On the sides of the cup 186, liquid may pass freely from above and below the cup 186. As liquid exits the bag 136, when the container 30''' is inverted, it all enters the cup 186 for measurement.

This design of the cup 186 is beneficial in that it is formed using a single injection mold of the upper chamber 178. This saves substantial cost in manufacturing additional pieces in separate injection molding operations or manufacturing runs in order to later install those pieces into the upper chamber 178. Through this process, portions of the upper chamber 178 are used create the cup 136 rather than inserting or molding a separate piece. In the area to the sides of the cup 136, liquid may flow freely. This allows a pump mechanism to be inserted through the neck and the container 30''' to operate just as other "squirt style" containers operate.

Figure 12:
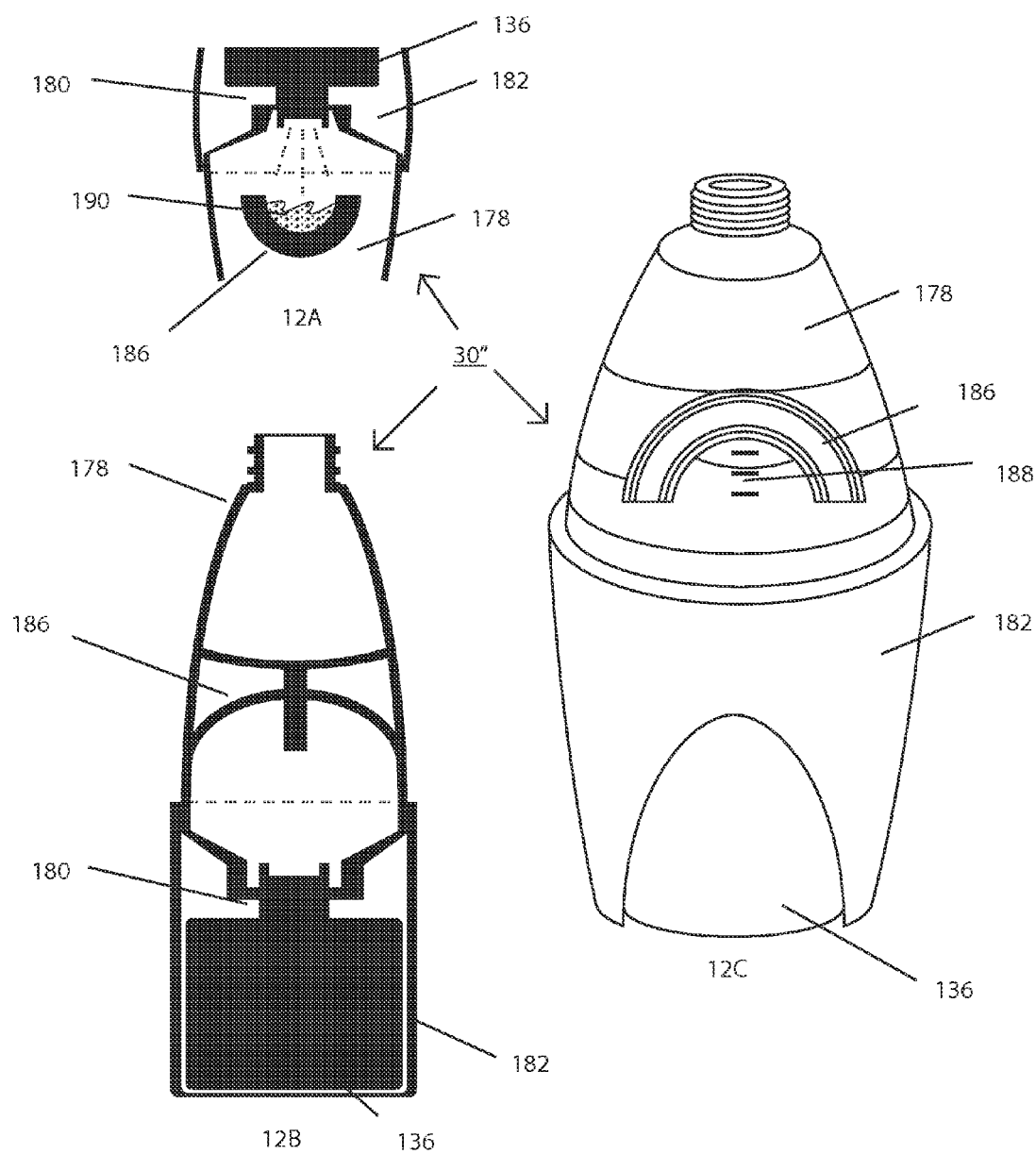
FIG. 12, made up of FIG. 12A, FIG. 12B and FIG. 12C are additional cross-sectional and perspective views of the embodiment show in FIG. 11.

Referring now to FIG. 12, made up of FIGS. 12A, 12B and 12C, additional views of the mixer container 30''' of this embodiment are shown. In 12A, a close-up on the inverted container is shown, including the cup 186. The bag 136 is being squeezed, within the base 182 such that the valve assembly 180 allows passage of the concentrate through to the upper chamber 178. The liquid 190 is shown gathering in the cup 186.

Referring now to FIG. 12B, a cross-section of the container 30''' from 90 degrees around the radius of the container is shown. From this angle, one can see the cup 186 as it is formed from the portions of the upper chamber 178 which meet in the middle of the container. The bag 136, base 182 and valve assembly 180 are also shown. From this angle in cross-section, it can be seen that the two opposing portions of the upper chamber 178 meet precisely in the middle of the container 30'''. The passages on either side of the cup 186, may be seen in FIG. 11B.

Referring now to FIG. 12C, the measurement lines 188 may be clearly seen below (as pictured) the cup 186. When the container 30''' is inverted the measurement lines 188 may be used to measure the amount of liquid leaving the bag 136 and entering the upper chamber 178 prior to adding concentrate.

In order to operate the container 30''' of this embodiment, the user must invert the container 30''' (See FIG. 12A). Next, the user applies pressure to the bag 136 which empties contents into the cup 186. The measurement lines 188 may then be used to measure a desired amount of concentrate. Once the desired amount is added to the cup 186 and measured using the measurement lines 188, the user may then right the container 30''', add water (or other suitable diluents), shake the container 30''' if desired and the mixture is completed.

Figure 13:
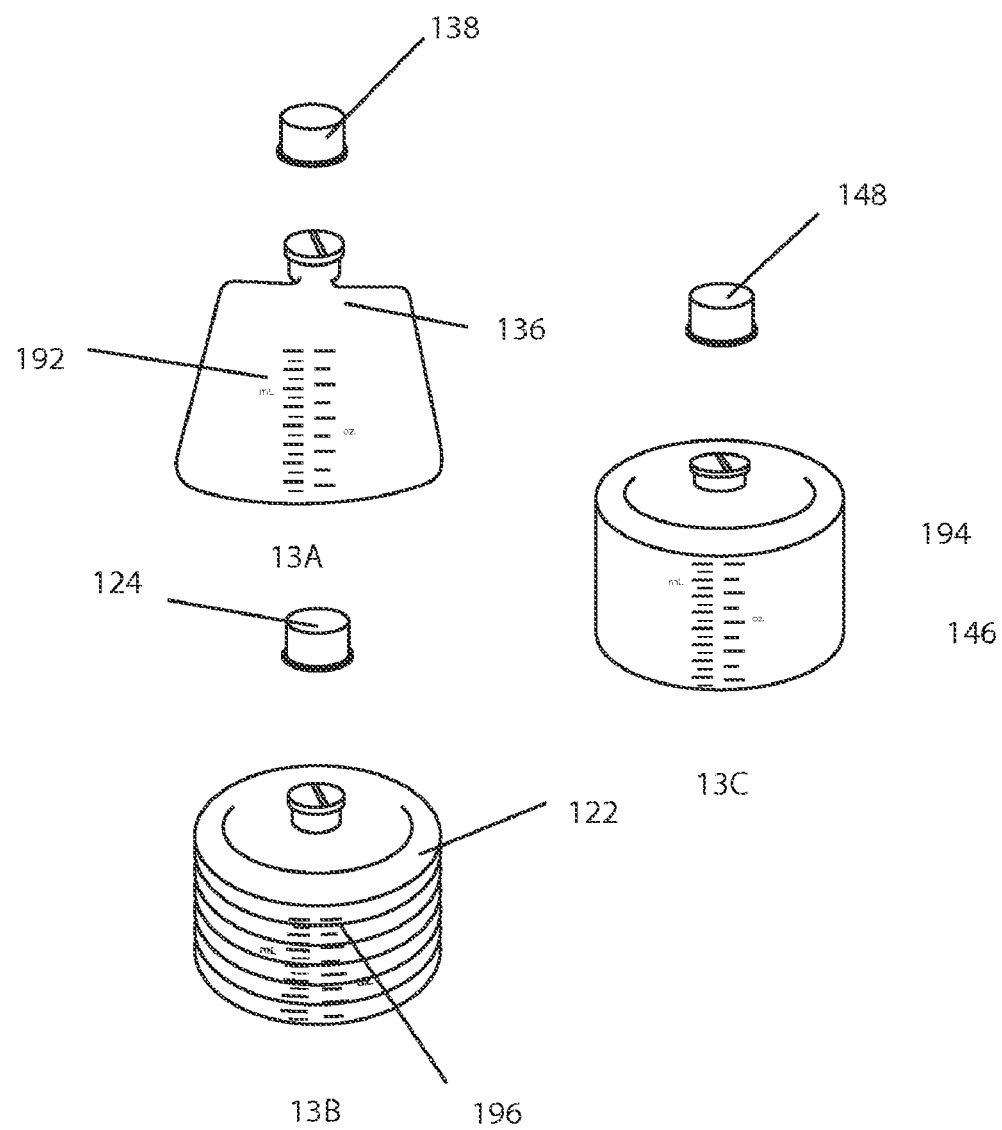
FIG. 13, made up of FIGS. 13A, 13B and 13C, is a series of perspective views of the replaceable chambers including a measurement apparatus.

Referring now to FIGS. 13A, 13B and 13C, measurement means is shown as a portion of each type of replaceable container. Measurement lines 192 and measurement lines 194 may be provided in the single-chamber collapsible bag 136 and the non-collapsible chamber 146.

Similarly, the multi-chambered collapsible bag 122 may include measurement lines 196 so that the contents passing through a valve assembly 104 may be measured as they leave, rather than once they arrive in the upper chamber 100 (see FIG. 10). In each case, the multi-chamber collapsible bag 122, the single-chamber collapsible bag 136 and the non-collapsible chamber 146 are provided with a cap 124, a cap 138 and a cap 148, respectively.

It is intended that the mixer container of the present invention be reusable such that each of the components other than the replaceable chamber or bag may be used a number of times prior to their disposal. In this way, the mixer container acts as an appliance, accepting various types of input liquids. For example, the mixer container may be used in conjunction with one cleaning product until exhaustion, whereupon a user may purchase and use an alternate cleaning product for use with the same mixer container, simply by replacing the replaceable chamber or bag with a different product and suitably mixing the contents.

Similarly, the apparatus of this invention may be used for various types of products. Replacing only a portion of the mixer container results in substantially less waste, over the long run, than replacing the entire container each time it is depleted. This results in benefits for the environment and less expense in disposing of the waste products created then discarded once each container is depleted (as is in the prior art).

The cost to ship concentrate, as opposed to fully-diluted chemical mixtures, for example cleaners, drink and food additives, pesticides or herbicides, is substantially less than the cost to ship concentrate. This results in substantial savings for manufacturers and users of the combined mixer container.

While the foregoing detailed description has described several embodiments of a mixer container 30, 30' and 30'' in accordance with the present invention, it is to be understood that the above description is illustrative only and not limiting of the disclosed invention. Indeed, it will be appreciated that the embodiments discussed above and the virtually infinite embodiments that are not mentioned could easily be within the scope and spirit of the present invention. Thus, the present invention is to be limited only by the claims as set forth below.

What is claimed is:

1. A mixing and dispensing apparatus comprising:
   a first chamber capable of holding a liquid;
   a replaceable second chamber capable of holding a liquid;
   a mixing receptacle within said first chamber for receiving measurable amounts of liquid from said second chamber; and
   valve means between said first and second chambers for maintaining separation between the contents of said first and second chambers;
   wherein said valve means act, upon pressure from said second chamber, to allow-the introduction of the contents of said second chamber into said mixing receptacle within said first chamber; and
   wherein said valve means further act, upon the release of said pressure from said second chamber, to close thereby disallowing the contents of said first chamber from returning to said second chamber.

2. The apparatus of claim 1, further comprising means for attaching dispensing means to said first chamber.

3. The apparatus of claim 1, wherein said valve means include an LMS valve.

4. The apparatus of claim 1, wherein said valve means include a duck valve.

5. The apparatus of claim 1, further comprising a notched snap-in connector between said first chamber and said valve means.

6. The apparatus of claim 1, further comprising means for attaching said replaceable second chamber to said valve means.

7. The apparatus of claim 1, wherein said second chamber is a collapsible bag.

8. The apparatus of claim 7 wherein said collapsible bag includes at least two separate chambers.

9. A mixing and dispensing apparatus comprising:
   a first chamber, capable of holding a liquid;
   a replaceable second chamber, capable of holding a liquid and including a tamper indicating closure;
   a measurement cup within said first chamber positioned to receive liquid from said second chamber;
   valve means, including a valve, a first notched snap-in connector for connecting said valve means to said first chamber and a second notched snap-in connector for connecting said valve means to said replaceable second chamber;
   means for attaching a dispenser cap to said first chamber; and
   a base, surrounding said replaceable second chamber and attached to said first chamber by a third notched snap-in connector, providing stability when the apparatus is placed on a surface.

10. The apparatus of claim 9 wherein said replaceable second chamber is a collapsible bag.

11. The apparatus of claim 10, wherein said collapsible bag is made up of at least two separate chambers.

12. The apparatus of claim 9, wherein said replaceable second chamber is a non-collapsible, replaceable chamber.

13. The apparatus of claim 9, wherein said valve means includes an LMS valve.

14. The apparatus of claim 9 wherein said valve means includes a duck valve.

15. The apparatus of claim 9 wherein said measurement cup includes measurement lines, said cup formed from the joining of two opposite sides of said first chamber, whereby a user may introduce liquid to said first chamber from said replaceable second chamber while the apparatus is inverted, and said liquid is captured in said measurement cup for measuring.

16. A method of using a combined mixing and dispensing apparatus comprising the steps of:
    affixing a replaceable collapsible chamber to valve means;
    introducing the contents of said replaceable collapsible chamber to a measuring receptacle within a fixed chamber through said valve means;
    emptying the contents of said replaceable collapsible chamber over time; and
    replacing said replaceable collapsible chamber with a new replaceable collapsible chamber.

17. The method of claim 16, wherein said introducing step comprises applying pressure to said replaceable collapsible chamber to thereby open said valve means to force contents of said replaceable collapsible chamber into said fixed chamber.

18. The method of claim 16, wherein said replaceable collapsible chamber is multi-chambered and further wherein said emptying step comprises repeating said introducing step at least twice for at least two sub-chambers within said collapsible chamber.

19. The method of claim 17, wherein said introducing step further comprises applying pressure to said replaceable collapsible chamber, sufficient only to collapse one of said sub-chambers and subsequently applying additional pressure to thereby collapse another of said sub-chambers.

20. The method of claim 16, wherein said replacing step comprises the steps of:
    removing said replaceable collapsible chamber;
    introducing a new replaceable collapsible chamber;
    removing a tamper indicating closure in the top of said new replaceable collapsible chamber; and
    removably attaching said new replaceable collapsible chamber to the combined mixing and dispensing apparatus.

* * * * *